United States Patent [19]

Vaughn et al.

[11] Patent Number: 5,320,905
[45] Date of Patent: Jun. 14, 1994

[54] IONOMERS OF ETHYLENE/CARBOXYLIC ACID COPOLYMERS

[75] Inventors: Walter L. Vaughn, Lake Jackson; Thomas J. McKeand, Jr., Clute, both of Tex.

[73] Assignee: The Dow Chemical Company, Midland, Mich.

[21] Appl. No.: 843,879

[22] Filed: Feb. 27, 1992

Related U.S. Application Data

[60] Division of Ser. No. 450,119, Dec. 12, 1989, abandoned, and a continuation-in-part of Ser. No. 429,879, Oct. 31, 1989, Pat. No. 5,133,864, which is a continuation-in-part of Ser. No. 234,978, Aug. 22, 1988, abandoned, which is a division of Ser. No. 776,534, Sep. 16, 1985, Pat. No. 4,766,036.

[51] Int. Cl.$^5$ ............... C08F 8/44; C08F 8/42; C08F 8/14; B29B 9/06

[52] U.S. Cl. .................. 428/401; 428/402; 521/25; 525/196; 525/329.7; 525/330.2; 525/360; 525/366; 525/367; 525/369; 525/370; 525/371; 525/373; 525/919; 526/318.6; 526/348.1; 526/909; 528/488; 528/489; 528/502

[58] Field of Search .......... 525/360, 330.2, 369, 525/329.7, 196, 919; 528/488, 489, 502; 428/401, 402

[56] References Cited

U.S. PATENT DOCUMENTS 3,801,551  4/1974  Bohme ............... 525/192

Primary Examiner—Fred Zitomer

[57] ABSTRACT

Novel ionomers of normally solid, thermo-plastic, orientable, copolymers of ethylene and at least one alpha,-beta-ethylenically-unsaturated carboxylic acid having a relatively high content of the carboxylic acid are prepared under conditions whereby the copolymers are essentially solubilized in a strong base and contacted with at least one compound which contains ionomer-forming cations. One of the preferred polymers is an ethylene/acrylic acid copolymer. The so-formed ionomers are useful as materials for constructing various items and articles.

23 Claims, No Drawings

IONOMERS OF ETHYLENE/CARBOXYLIC ACID COPOLYMERS

CROSS-REFERENCE TO RELATED APPLICATIONS

This is a divisional application of Ser. No. 07/450,119 filed Dec. 12, 1989, which is now abandoned. is a continuation-in-part application of Ser. No. 07/429,879 filed Oct. 31, 1989; now U.S. Pat. No. 5,133,864; which is a continuation-in-part of Ser. No. 07/234,978 filed Aug. 22, 1988, now abandoned, which is itself a divisional application of Ser. No. 06/776,534 filed Sep. 16, 1985, now U.S. Pat. No. 4,766,036. These are incorporated herein by reference.

FIELD OF THE INVENTION

Ionomer copolymers of ethylene/acrylic or methacrylic acid and method of making powders of them.

BACKGROUND OF THE INVENTION

It is well known that there are a large number of man-made thermoplastic polymers and resins which can be melt-extruded as monofilaments for the making of chopped fibers, or as continuous filaments. Many of these can be extruded as multifilaments or fine denier filaments. Fibers and filaments of large denier (generally greater than 15 denier) can usually be prepared from any thermoplastic polymer or resin which has a melt strength sufficient to withstand the tensile forces (gravitational or supergravitational) acting on the weakest portion of the extrudate.

Olefin/unsaturated carboxylic acid copolymers (especially ethylene/acrylic acid) in the form of pellets may be digested with an alcohol/caustic mixture causing the pellets to spontaneously convert into colloidal particles (U.S. Pat. No. 3,798,194) or the pellets may be digested in an amine and agitated to obtain small, noncolloidal, particles and fibers (U.S. Pat. No. 3,790,521). Such olefin/carboxylic acid copolymers are said to be hot-drawn as strands, the strands chopped into pellets, and the pellets digested with an alkali to obtain, upon shearing, small fibers (U.S. Pat. No. 3,801,551).

Ethylene polymerized with unsaturated organic carboxylic acids (ECA), e.g., acrylic acid (EAA), to form copolymers is taught, e.g., in U.S. Pat. No. 2,391,218; U.S. Pat. No. 3,520,861 and U.S. Pat. No. 4,351,931. Copolymers of ethylene and such acids can be made by grafting the acid onto polyethylene, by batch or continuous polymerization of mixtures of monomers of ethylene and the acid, by polymerization of mixtures of monomers of ethylene and the acid in a tubular reactor, and hydrolysis of copolymers of ethylene/alkyl acrylates which converts the ester groups to carboxylic acid groups. Also, block copolymers can be made whereby chain segments of polyacrylic acid and chain segments of polyethylene form long polymer chains. Any of these known ethylene/acid copolymers are suitable for use in the present invention, so long as they are of sufficient molecular weight to be formed into solid particles, fibers or filaments and contain a relatively high level of the acid comonomer. Thus, the purview of the present disclosure includes, inter alia, ethylenic polymers containing a relatively high level of carboxylic acid groups in their molecular structure.

For purposes of this disclosure, we define "relatively high level of carboxylic acid groups" as being those in which the carboxylic acid comonomer which is copolymerized with the ethylene is present in the copolymer in amounts of from about 15 to about 50 weight percent. There are prior art disclosures of using up to about 12% of acid groups in the comonomer whereby the ionomer forms are prepared by melt-reacting the carboxylic acid groups with such things as NaOH, KOH, MgO, CaO, and the like on hot roll mills or other means for melting the polymer in order to obtain some degree of contact of the acid groups with the reactant; these methods usually do not convert a very high percentage of the acid groups to the ionomer form.

It was discovered that there were unexpected characteristics resulting from a change in the known process of forming fibers of certain polymers, such as ethylene/unsaturated carboxylic acid (ECA) copolymers, said known process being that of digesting extruded strands of the polymer in a reagent which substantially reacts with side-groups pendent from the polymer molecule and then subjecting the so-treated polymer to shearing forces to cause fibrillation or particulation of the polymer strands. The said change in the process involves, as the principal distinguishing feature, the orientation (i.e. "stretching") of the polymer at a temperature below that at which stress-relaxation of the stretched polymer molecules is substantially encountered; this may be referred to as "cold-drawing, cold-stretching" or "crystalline orientation".

It is customary, in some production processes, for polymers leaving a polymerization vessel to be melt-extruded through a die as strands which are chopped into pellets and cooled in a water bath without having been oriented by a significant amount of stretching. U.S. Pat. No. 3,801,551 discloses that such pellets may then be digested in alkaline material and then fibrillated using shearing forces. Since the strands are cut into pellets before the strands have cooled to the point at which crystallization occurs, then stress relaxation of the polymer molecules permits intertwining of the molecules. When such pellets are treated in accordance with U.S. Pat. No. 3,801,551 to prepare fibers, the fibers are relatively short and have very little porosity, if any. Polymers produced as small particles may also be melted, extruded as strands, and chopped into pellets before the intended end-use.

It has been found that if the extruded strands of polymer are allowed to cool to an extent, and for a time, sufficient to allow an appreciable amount of crystallization and are then oriented, the crystallized molecules become substantially untwined and become substantially aligned in parallel relationship with the direction of orientation. This also draws the strands to narrower dimensions. Since the polymer, when oriented, is cold enough for the molecules to be crystallized, and not hot enough to allow stress-relaxation of the molecules, then the molecules remain dimensionally stable after the orientation is completed. When these oriented strands are treated with a reagent which reacts with the side-groups, (e.g. 0.5N NaOH) and subjected to shearing or crushing, the strands undergo fibrillation into fibers which are extensively porous. Most of the pores are small enough to be considered micropores. These micropores permeate the length and breadth of the fibers. Even if the so-oriented strands are chopped into pellets before being treated with alkali and subjected to shearing or crushing, the so-formed fibers are extensively porous and are longer than fibers prepared from pellets of the same dimensions treated in accordance with U.S. Pat. No. 3,801,551.

This same phenomenon is observed when cold-oriented films or strips are treated with alkali and sheared or crushed into fibers, and to a greater degree than when using films or strips which are stretched at high temperatures where stress relaxation of the polymer molecules is possible.

Ionomers (esp. metal salts) of ethylene/acrylic acid, ethylene/methacrylic acid and other like copolymers have been disclosed in many patents over the years. They are known to be tough polymers, some of them even being useful ingredients used in, e.g., golf-ball covers. Ammonia dispersions have been applied in products used in paper sizing, carpet backing, and other end-used. For the most part the ionomers have involved copolymers having less than 15% of the acid moiety in the copolymers, and have relied on reactions of the acid copolymers with reagents to form ionomers, which reactions usually leave a substantial amount of the acid groups non-reacted.

There is a perceived need for ionomers which not only have higher acid monomer contents, but which have all or nearly all of the acid groups converted to ionomer groups, leaving little or none of the acid groups in an unreacted (i.e. non-ionomerized) form.

SUMMARY OF THE INVENTION

One aspect of this invention is a method of making particulate forms of metal ionomers of a normally-solid copolymer comprising about 85 to about 50 weight percent of aliphatic olefin (especially ethylene) and about 15 to about 50 weight percent of at least one alpha,beta-ethylenically unsaturated carboxylic acid, said method comprising forming a dispersion of the copolymer in an aqueous alkaline solution at a temperature elevated above normal room temperature, thereby swelling the copolymer and forming alkali acrylate groups, using agitation of sufficient force to break up clumps of the so-reacted polymer and cause the formation of a uniform, very fine particle size dispersion of the copolymer, adding (preferably with strong agitation) at least one aqueous solution which contains at least one preselected cationic metal compound or metal complex in ionized form, thereby converting the alkali acrylate groups to ionomer metal salt groups which precipitate into a slurry of distinct particles, optionally, filtering the dispersion through a filter which permits the small slurry particles to pass through but which removes any clumps which may not have been completely particulated by the agitation, filtering the slurry through a filter having pores small enough to prevent the fine slurry particles from passing through, thereby draining off excess aqueous solution and leaving a filter cake, washing the filter with water to remove excess dissolved compounds, if desired, drying the filter cake product so-collected and grinding the product to obtain a predetermined small mesh size powder.

If desired, one may lower the pH of the slurry slightly into the acid range in order to obtain faster drainage during filtering.

Another aspect of this invention is the novel ionomer powder prepared by the process outlined above.

Yet another aspect of this invention is the formation of aggregates of the ionomer powders or fibers into useful articles, items, coatings, or structures such as porous, compacted (or sintered) articles or melt-extruded articles, such as films, slabs, rods, or engineering material castings. The engineering materials made from the ionomer particles are stronger and tougher than the beginning copolymers. Porous compacted (or sintered) articles can be used, for example, as filters or ion-exchange materials wherein the cationic metal or ion can be replaced by other metals or ions. Furthermore, aggregates comprising the ionomer particles can be prepared wherein the ionomer particles are mixed with other materials, such as other engineering plastics, either of the thermoplastic variety or the thermoset variety. The ionomer particles can be bound to each other by the use of adherable or coherable plastics or resins. The ionomer particles can serve as binders for producing monolithic structures of other particles, either of the organic variety, the inorganic variety, or naturally occurring variety (such as minerals, cellulosics, and the like.)

DETAILED DESCRIPTION INCLUDING BEST MODE KNOWN

This invention pertains to high surface area olefin/carboxylic acid copolymers in the form of particles and ionomer particles. The preferred copolymer is ethylene/acrylic acid (EAA) copolymer and for that reason and for reasons of conciseness, the descriptions in this disclosure are directed to that particular copolymer; however, it is within the purview of the present concept to use other copolymers as will be discussed hereinafter.

The invention is especially directed to high surface area EAA powder and ionomer powders of EAA which are obtainable directly from aqueous dispersions of particles which typically contain particles of 300–500 A° (angstroms) and even as low as 200–250 A° particle size. The powders derived from such dispersions are agglomerations which can be broken down to a fine powder, e.g. a "flour", or used in microporous "sponge-like" structures which typically exhibit a particle size between 16 and 100 mesh and are routinely obtained at 20–40 mesh for use in powder coatings or for ion-exchange materials. It is within the purview of the present concept that these powders are useful, e.g., in the areas of precious metal recovery, pollution control, feed stock polishing, color removal from liquids, and as materials for making plastic articles. Its use as a so-called "engineering material" is encompassed within the present concept.

A preferred form of the beginning copolymer for use in the method outlined above is one which has been prepared by a method which comprises a) orienting a normally-solid, thermoplastic, orientable, substantially non-elastic polymer having reactive side-groups in the molecular structure of the polymer, said orienting being done at a temperature below that at which a substantial amount of stress relaxation of the stretched molecules is possible, said orienting causing said molecules to align in substantially parallel manner along the direction of orientation, b) treating the polymer with an alkaline reagent (such as caustic) which reacts with the reactive groups in the polymer molecular structure, causing swelling of the oriented polymer, while c) subjecting the so-swelled polymer to shearing or crushing or other physical force which causes the polymer molecules to undergo sufficient separation so as to form particles and/or fibers having microporosity thereby providing a high availability of the acid groups for reaction. These particles preferably have a size in the range of about 20–300 (U.S. Standard Sieve Size).

Preferably, the comonomers contain about 15 to about 25 weight of the acid monomer, more preferably about 20%±5%, most preferably about 20% ±3% of the acid monomer.

Copolymers prepared by the above method are more readily and thoroughly reacted with other compounds to form dispersions or to form metal ionomers because the steric exposure of the carboxyl groups is enhanced and as much as 90% or more of the acid groups are converted to ionomers. It is within the purview of the present concept to employ normally-solid, thermoplastic, orientable organic polymers comprised of chain segments which conform essentially to at least one of the following graphic representations of formulae:

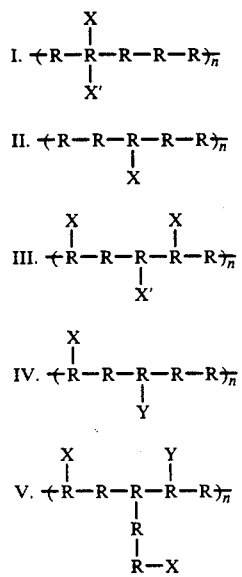

where R represents repeating olefin polymer units (especially ethylene) forming the stable polymer chain by way of polymerized olefin monomers; n is a number, representing a plurality of the repeating chain segments, that is sufficient to provide normally-solid polymers which are thermally extrudable; X represents substantially reactive or polar side-groups on the polymer; X′ represents substantially reactive or polar side-groups that are different from X but may or may not be reactable with the same reagents that react with X; Y represents side-groups that are not reactable with the reagents which react with X.

Thus, it is within the purview of the present concept to employ olefin polymers which have long chain molecular structures formed by the polymerization of monomers comprising at least one olefin or combinations of olefins, said molecular structures having pendent side-groups which may be substantially all alike or may not be all alike but which are reactive or reactable with a reagent which swells the polymer, and there may also be some pendent side-groups which are not reactive or reactable with the same reagent that is reactable with the said reagent. These non-reactive side-groups may be non-olefin moieties of olefin monomers that are pendent from the polymer chain, such as the alkyl moiety of $C_3$–$C_{12}$ olefins, e.g., propylene, butene, heptene, hexene, octene, dodecene, styrene, and the like, or may be branches of polymerized olefin units which are pendent from the main polymer chain. Furthermore, it is possible, within the purview of the present concept, to employ monomers which are polymerized into the polymer chain through their olefin or vinyl unsaturation whereby pendent moieties of said monomers comprise relatively non-reactive groups such as halogens, esters, nitriles, phenyls, aryls; alkyls, imides, or amides. By "relatively non-reactive" it is meant that the groups undergo little or no reaction with the reagent under conditions at which the reactive groups undergo substantial reaction with the reagent. Polymers which contain such relatively non-reactive side-groups, may exert an influence on the reaction by contributing to the swelling, such as by hydration due to hydrogen bonding between water and the group.

As an example, consider polymers which contain side-groups having reactive carboxylic acid moieties and which also contain the pendent alkyl ester groups of an alkyl acrylate; the carboxylic acid groups can be reacted with a reagent, such as aq. NaOH, under conditions wherein the Na salt of the carboxylic acid is formed, but substantially leaving the alkyl ester groups intact. Likewise, a halogen group on a polymer chain can remain intact (unreacted) under conditions wherein the carboxylic acid group is reacted. However, if the reagent is strong enough, and the reaction conditions stringent enough, even many of the "relatively non-reactive" pendent groups, such as alkyl ester and halogen groups, may be caused to react. For instance, the neutralization of —COOH groups by reaction with NaOH is performed more readily than the saponification of—COOR groups with NaOH.

In general the preferred embodiment of the present novel process comprises: orienting the polymer at a temperature (usually ambient or more) below that at which stress relaxation of the stretched molecules is likely to be encountered; cutting, slicing, or chopping the oriented polymer to desired physical dimension, if needed; reacting the reactive side groups of the polymer with a reagent, thereby changing the side groups and swelling the polymer; subjecting the polymer to stress which causes fibrillation or strand separation of the polymer; using a counter-reagent to return the side groups to their original form or to some other suitable form, thereby creating voids in the polymer. Optionally, the reaction with the counter-reagent can be done before subjecting the reacted polymer to fibrillation or strand separation stresses. If the beginning polymer at hand is one which has already been oriented then that initial step as outlined above need not be repeated.

Within the purview of the present invention, the following reactions are among those which may be performed in swelling the oriented polymers:

| Reactive Side Groups Pendent from a C in the Polymer Chain | Reagent, where M is Metal or $NH_4$, R is Alkyl, X is Halide | Product of Reaction |
|---|---|---|
| —COOH | MOH | —COOM + $H_2O$ |
| —$CH_2$—COOH | MOH | —$CH_2$—COOM + $H_2O$ |

-continued

| Reactive Side Groups Pendent from a C in the Polymer Chain | Reagent, where M is Metal or NH₄, R is Alkyl, X is Halide | Product of Reaction |
| --- | --- | --- |
| —COOR | MOH | —COOM + ROH |
| —X | MOH | —OH + MX |
| —O(OC)R | MOH | —OH + R(CO)OM |
| —C—O—NH₂ | MOH + H₂O | —COOM + NH₄OH |

Another polymer of interest here is a terpolymer of ethylene/carbon monoxide/unsaturated carboxylic acid (e.g. acrylic or methacrylic acid) wherein the carbon monoxide provides carbonyl (keytone) groups along the chain and the acid provides reactive groups along the chain.

Much of the following descriptions, examples, and explanations are directed to olefin polymers having carboxylic acid side-groups, such as ethylene/acrylic acid (EAA) copolymers, which are among the preferred polymers in the present invention, but the invention is not limited to such polymers. It will be apparent to readers of this disclosure, who are skilled in these relevant arts, that other solid orientable polymers having reactive side-groups may be employed in substantially the same manner as described herein using essentially the descriptions and explanations provided for said EAA polymers.

Whereas virtually any reasonable shape or size of the ethylene/carboxylic acid (ECA) copolymers may be used as the beginning material which is formed into a dispersion by treatment with the strong alkaline material, it will be readily understood that the smaller the beginning parts, the easier it is to get speedier dispersivity. In addition to having small granules, particles, powders, or fibers as the preferred shape or size, it is even more preferred if they are also microporous, as described supra.

The following examples illustrate certain embodiments, but the invention is not limited to the particular embodiments illustrated.

Example 1 (Comparison with prior art)

In accordance with prior art, an ethylene/acrylic acid copolymer containing 20 wt. % acrylic acid and 80% ethylene, exhibiting a melt index of 300, was melt extruded into a continuous filament of ⅛ diameter, and quenched in water to room temperature. One-inch long segments were cut from the strand and swelled in 0.5N NaOH for 2 hours at 50–55° C. The segments were readily fibrillated by physical stress into fibers about 1/32 to 1/16 inches long, having a length-to-diameter ratio of about 10–15. The fibers were essentially non-porous.

In accordance with the present invention another strand as above was prepared and cooled, but was cold-stretched (oriented) about 100% (one foot stretched to about 2 feet). From this oriented strand were cut one-inch long segments which were swelled for 2 hours at 50–55° C. in 0.5N NaOH. The segments were readily fibrillated by physical stress into fibers having a length-to-diameter ratio of 300–500 and the fibers were found to be extensively microporous. Fiber lengths of about ⅛" to be easily fabricable into mats and sheets using paper-making techniques.

Example 2

A 10 gm filament of ethylene (80%)/acrylic acid (20%) copolymer of ⅛" diameter was cold-drawn (by hand) by a factor of 1.5–2.0 and cut into 1" segments and placed in a swelling bath containing 0.5N NaOH at 55–60° C. The filament segments, swelled for 4 hours, turned white (they had been essentially clear) and rubbery during swelling. The filaments were drained, washed with de-ionized water, and placed in a bottle with de-ionized water (5% polymer in water) and allowed to shake vigorously on a laboratory mechanical shaker overnight (about 16 hours). An aqueous fiber slurry resulted with fibers ranging up to 1" in length. The slurry was cast onto a 100-mesh wire screen and the water was removed by suction (vacuum) applied to reverse side of the screen. The mat was allowed to air dry and was examined by microscopy. Fibers of 10–30 microns diameter were common with fibrils (branching) of 2–5 microns being very abundant. The fibers were found to be ribbon-like with fibrils composed of small appendage ribbons split from the parent ribbon, and were found to be extensively microporous. The so-formed mat was tough and very strong.

These ribbon-like fine fibers having fibril appendages are believed to be novel and are very useful by way of the tiny fibrils which entangle and give rise to mats, sheets, and articles of exceptional strength without the need to apply supplemental bonding. Furthermore, these novel fibers are quite useful as a blend component with other fibers, such as wood fibers, cotton fibers, cellulose fibers, nylon fibers, wool fibers, polyester fibers, other olefin polymer fibers (e.g. polypropylene), mineral fibers (e.g. asbestos), fiberglass, and other natural or synthetic fibers. The bonding tenacity of the fibril appendages provides considerable strength to mats drawn from a slurry of the blended fibers and also to hot castings of such blends. Filters are made using the above materials.

Still further, the present fibers with the fibril appendages provide strongly bonded composites with non-fibrous pigments, fillers, polymers, resins, or other additives, such as clay, calcium carbonate, titanium dioxide, and other inorganics. The fibers are highly water-absorbent and readily disperse in water to form a synthetic pulp resembling wood pulp; it also behaves much like quality wood pulp in formation of non-wovens. Non-woven products also resemble bleached, refined wood pulp (paper) under microscopic examination.

Example 3: Microporous, Oriented Fibers Derived from Melt Spun Polymers

An EAA copolymer (80 wt. % ethylene-20 wt. % acrylic acid and a 300 melt flow value) was extruded through a spinnerette die into a 500-micron diameter strand at 125° C. and then drawn to a 10-micron diameter filament (a drawdown ratio of 1:625, based on filament cross-section. The filament contained orientation resembling a cold-drawn filament. The melt spun fibers were cut from the core (of the haul off unit) in a sheet. The sheet was divided into strips parallel with the fiber length axis. The strips were then mechanically chopped into fibers of 7-10mm length. The fibers were placed in a Waring blender with water and dispersed, then recovered and redispersed in an excess of a solution containing 0.5N NaOH. The mixture, containing about 15 wt. % chopped fiber by weight, was stirred and heated at 60-65° C. for about 10-12 minutes. The swollen fibers were drained and thoroughly washed with deionized water and cast onto a 60 mesh stainless steel wire screen. Excess water was drawn off under vacuum and the mat was air dried. The white mat (or felt) exhibited very little strength, due to the absence of pendent fibrils, but did possess microporosity of a fibrillar or slot-like texture. The microporous chopped fibers were useful as intermediates for forming high melting (m.p. above 200° C.) aluminum salt derivative fibers, formed by contacting the microporous chopped fibers with an aqueous solution containing 0.5 wt. % aluminum sulfate. The derivative ionomer fibers contained 1.3 wt. % aluminum by weight and were also microporous.

These particles of aluminum ionomer are thermally moldable into monolithic and coherent articles such as sheets, slabs, strands, rods, films, and the like.

Example 4. Exchange of Cations

An ethylene/acrylic acid copolymer (20% AA by wt., 300 melt flow rate) cold-drawn and caustic treated to cause swelling, is fibrillated and washed with water. The so-produced fibers, having extensive microporosity, are found to exchange cations in solutions containing metals, thereby creating ionomers (metal carboxylates) with the carboxylic functionalities on the polymer. The following metals are exchanged, though not all at the same rates:

| Metals Exchanged, Periodic Group No. | Especially These Metals |
|---|---|
| IA | Li, Na, K, Rb |
| IB | Cu, Ag, Au |
| IIA | Mg, Ca, Sr, Ba |
| IIB | Zn, Cd, Hg |
| IIIA | Al, Ga, In |
| IIIB* | Sc, Y, La, Ce, Nd, Sm, U |
| IVA | Ge, Sn, Pb |
| IVB | Ti, Zr, Hf |
| VA | As, Sb, Bi |
| VB | V, Nb, Ta |
| VIA | Se, Te |
| VIB | Cr, Mo, W |
| VIIB | Mn, Re |
| VIII | Fe, Co, Ni, Ru, Rh, Pd, Os, Ir, Pt |

*including the Lathanides and Actinides

These metal ionomers of these microporous polymers are novel and useful. They can be used for adding metal values to other materials or for subsequent exchanges of cations. They can also be molded into various shapes and configurations. The ionomers can be used in filters in the form of fibers, filaments, cords, bonded mats of fibers, woven mats, porous sintered particles, non-woven mats, and the like. They are also thermally moldable into substantially non-porous articles, such as slabs, sheets, films, rods, strands, and the like. They can be ground into fine particles prior to thermally molding in order to prepare articles which are even more non-porous than when such articles are molded from the larger particles which contain greater porosity.

We have determined that the instant microporous polymers are capable of forming ionomers with polyvalent metal ions readily, and to a very high degree of conversion, by cation exchange, whereas prior art involving EAA copolymers and divalent Mg and Ca have involved melt-compounding MgO and CaO into the polymer which created crosslinked polymer with the crosslink being substantially irreversible.

Example 5 (Ion-Exchange With Dissolved Metal)

A particulate form of the Na+ form of the EAA (20% AA), prepared in accordance with this invention, is added to an aqueous solution containing a dissolved copper compound which imparts a color to the aqueous solvent. After being well-mixed the particulate EAA ionomer so-formed is filtered out of the aqueous solution. The EAA comes out colored by the copper cations it has taken out of the solvent, and the solvent has become water-clear. The copper ionomer is moldable into coherent, monolithic structures. Similar results are obtained with a wide spectrum of other metals and other cations.

Example 6 (Removal of Sorbtive Material)

In similar manner as shown in Example 5 above, triethylamine is removed from an aqueous solution by being sorbed by the particulate polymer.

Example 7 (Removal of Chemi-sorbtive Material)

In similar manner as in Example 5 above, an insoluble form of iron hydroxide in alkaline solution having a cationic character is removed from an aqueous solution by being chemi-sorbed by the particulate polymer.

Example 8 (Procedure for Ionomers of Table I)

A 200 ml portion of a 25% solids dispersion (20% AA/80% ethylene of 300 g/10 min. MFR base polymer dispersed in aqueous ammonia) is placed into a Waring * (*trademark) blender. A 200 ml portion of de-ionized water is added and blended in to obtain a 12.5% solids dispersion, which has a low viscosity. A pre-determined amount of a metal cation ion solution selected from those show in Example 4 is injected by syringe into the blender as it is running to obtain a uniform product and uniform particle size. More water is added as needed to keep the particles well dispersed and moving. Enough 0.1N HCl is added neutralize the mixture to cause coagulation. The powder product is recovered by filtration, washed on a filter with de-ionized water, and the filter cake broken up and allowed to air dry. The dry cake is crushed and sieved to obtain a 20-50 mesh powder. Further blending to achieve a 50-70 mesh can be done where a finer powder is desired. In the following Table I selected examples of metals and their valences are shown, along with the Wt.% of the ion, the milliequivalents (Meq.) of the metal ion per gram of powder, the melting point (M.P.) in degree Celsius, and the residual capacity of COOH/gm in miliequivalents (Meq.) are shown.

TABLE I

| Metal | % Ion | Meq. Metal | M.P. °C. | Meq. COOH/gm |
|---|---|---|---|---|
| $Al^{3+}$ | 12.4 | 2.66 | >399 | nil* |
|  | 1.2 | 1.33 | >300 | 1.41 |
|  | 0.6 | 0.67 | 233 | 2.08 |
|  | 0.3 | 0.33 | 210 | 2.43 |
|  | 0.15 | 0.17 | 156 | 2.60 |
|  | 0.07 | 0.08 | 125 | 2.69 |
| $Fe^{3+}$ | 4.9 | 2.64 | 167 | nil* |
|  | 1.2 | 0.64 | 132 | 2.10 |
| $Pb^{2+}$ | 22.4 | 2.16 | 205 | nil* |
|  | 6.7 | 0.65 | 168 | 1.94 |

TABLE I-continued

| Metal | % Ion | Meq. Metal | M.P. °C. | Meq. COOH/gm |
|---|---|---|---|---|
| $Cu^{2+}$ | 8.1 | 2.57 | 137 | nil* |
|  | 2.0 | 0.63 | 124 | 2.08 |
| $Ca^{2+}$ | 5.2 | 2.60 | 190 | nil* |
|  | 1.3 | 0.65 | 117 | 2.09 |
| $Zn^{2+}$ | 8.4 | 2.57 | 168 | nil* |
|  | 2.1 | 0.64 | 108 | 2.07 |
| $Mg^{2+}$ | 3.3 | 2.68 | 160 | nil* |
|  | 0.82 | 0.67 | 116 | 2.07 |
| 0** | 0 | 0 | 100 | 1.77 |

*(nil means almost zero; no significant content)
**(no metal added to copolymer; used modified procedure using dry ice added to blender during dry blending to achieve a 20-70 mesh EAA powder)

The polymers of the present invention may also be mixed with other materials for use as filter materials, with the other materials providing, e.g., bulkiness, cohesion, economy, formability, esthetics, or other useful features.

What is claimed is:

1. A composite material comprising ionomer particles prepared from particulate forms of metal ionomers of a normally-solid copolymer of ethylene and at least one alpha, beta-ethylenically unsaturated carboxylic acid wherein the alpha, beta-ethylenically unsaturated carboxylic acid comprises about 15 to about 50 weight percent of the copolymer, wherein said ionomer particles are prepared by a method comprising orienting by cold-drawing a normally-solid, thermoplastic, orientable, substantially non-elastic polymer having reactive side-groups in the molecular structure of the polymer, said orienting being done at the temperature below that at which a substantial amount of stress relaxation of the stretched molecules is possible, said orienting causing said molecules to align in substantially parallel manner along the direction of the orientation.

forming a dispersion of the copolymer in an aqueous alkaline solution at a temperature elevated above normal room temperature, by shearing the copolymer to form particles having microporosity, continuing the shearing while adding at least one aqueous solution which contains at least one preselected cationic metal compound or complex in ionized form, thereby converting the carboxylic acid groups to ionomer metal salt groups, filtering the slurry through a filter having pores small enough to prevent the ionomer particles from passing, thereby draining off excess aqueous solution and leaving a filter cake, drying the filter cake product so-collected and grinding the product to obtain a particle having between 16 and 300 U.S. Standard Sieve Size.

2. The composite material of claim 1 wherein the polymer used in making the ionomer comprises a copolymer of ethylene/acrylic acid or ethylene/methacrylic acid acid having an acid content of about 15 to about 35 weight percent of the copolymer.

3. The composite material of claim 1 wherein the copolymer contains an acid content of about 15 to about 25 weight percent of the copolymer.

4. The composite material of claim 1 wherein the copolymer contains an acid content of about 15 to about 25 weight percent of the copolymer.

5. The composite material of claim 1 wherein the copolymer contains about 20%±5% by weight of the acid monomer.

6. The composite material of claim 1 wherein the copolymer contains about 20%±3% by weight of the acid.

7. The composite material of claim 1 wherein the particles are powders.

8. The composite material of claim 1 wherein the particles are fibers.

9. The composite material of claim 1 wherein the particles are used as a binder for thermoplastic or thermoset plastics.

10. The composite material of claim 1 wherein the particles are bound together by a binder comprising adherable or coherable plastics or resins.

11. The composite material of claim 1 wherein the particles are comprised in a sintered structure.

12. The composite material of claim 1 wherein the particles are comprised in an extruded structure.

13. The composite material of claim 1 wherein the particles comprise a porous ion-exchange structure.

14. The composite material of claim 1 wherein the particles are comprised in a film.

15. An aggregate structure comprising the particles of claim 1.

16. An aggregate structure comprising the particles of claim 1 wherein the particles are combined with other materials to form an integral structure.

17. A melt-extruded articles comprising the ionomer particles of claim 1.

18. A composite comprising particles of at least one cation exchangeable metal ionomer of an oriented, microporous, normally solid (i) copolymer of ethylene and at least one alpha, beta-ethylenically unsaturated carboxylic acid or (ii) terpolymer of ethylene/carbon monoxide/at least one alpha, beta-ethylenically unsaturated acid, the carboxylic acid comprising from about 15 to about 50 weight percent of the copolymer or terpolymer.

19. The composite of claim 4 wherein 90 percent or more of the carboxylic acid groups are converted to ionomers.

20. The composite of claim 5 wherein the ionomer is an oriented, microporous, normally solid copolymer of ethylene and acrylic acid.

21. The composite of claim 6 wherein the particles pass a 16 mesh screening and are retained on a 100 mesh screen U.S. Sieve Series.

22. The composite of claim 4 wherein the copolymer is an oriented, macroporous, normally solid copolymer of ethylene and acrylic acid.

23. The composite of claim 8 wherein the particles pass a 16 mesh and are retained on a 100 mesh screen, U.S. Sieve Series.

* * * * *